United States Patent [19]

Parker

[11] Patent Number: 4,519,142
[45] Date of Patent: May 28, 1985

[54] BLADE HEIGHT CALIBRATION DEVICE

[76] Inventor: Eli H. Parker, 2314 E. 37th St., Savannah, Ga. 31404

[21] Appl. No.: 461,854

[22] Filed: Jan. 28, 1983

[51] Int. Cl.³ .............................................. B27G 23/00
[52] U.S. Cl. ................................ 33/185 R; 33/169 B; 33/180 R
[58] Field of Search .......... 33/185 R, 169 B, 181 AT, 33/180 AT, DIG. 16, 178 D, 181 R, 180 R, 169 R

[56] References Cited

U.S. PATENT DOCUMENTS

| | | | |
|---|---|---|---|
| 1,225,835 | 5/1917 | Luck | 33/169 R |
| 1,465,694 | 8/1923 | Stauch | 33/169 R |
| 3,903,609 | 9/1975 | Brown | 33/169 B |

FOREIGN PATENT DOCUMENTS

| | | | |
|---|---|---|---|
| 1260106 | 3/1961 | France | 33/185 R |
| 5489 | of 1894 | United Kingdom | 33/169 B |

*Primary Examiner*—Willis Little
*Attorney, Agent, or Firm*—Newton, Hopkins & Ormsby

[57] ABSTRACT

A device is disclosed for calibrating the height of a blade above a blade drum surface of a blade drum on a machine comprising a base section, an upper section with a notched opening, a stabilizing apparatus securing the base section to the machine, an adjustable electrical contact projecting through the upper section into the notched opening, and electrical indication circuitry which is operative when the blade contacts the adjustable electrical contact.

13 Claims, 11 Drawing Figures

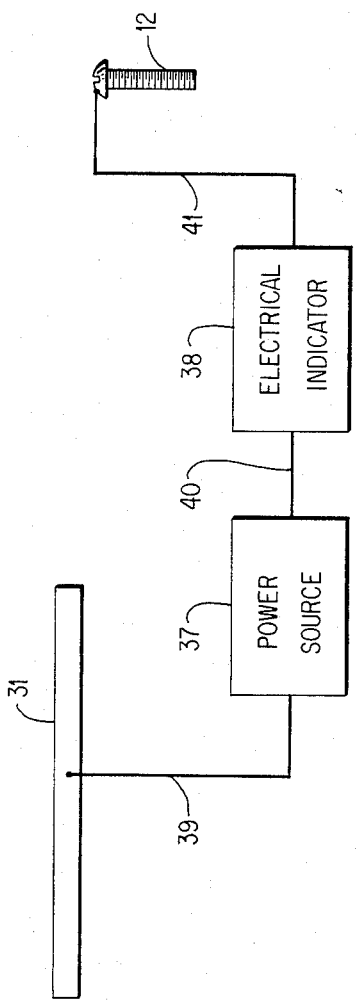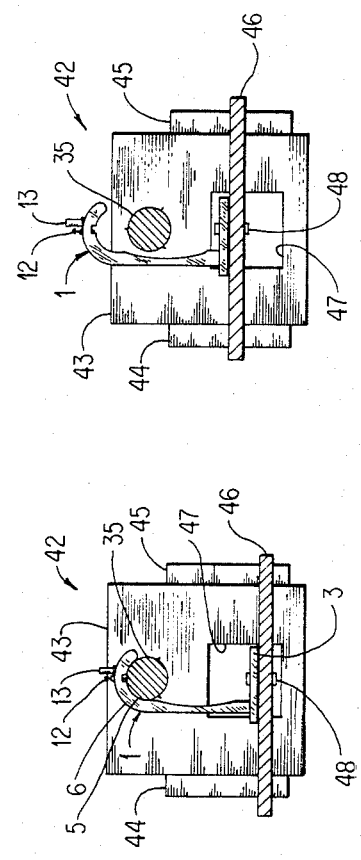

BLADE HEIGHT CALIBRATION DEVICE

This invention relates to a gauge means and more particularly to a gauge means which can be utilized to adjust blades which are secured onto a drum.

Various devices and tools are available which utilize blades secured to a blade drum. For various reasons, the blades may need to be removed or changed. These various reasons may include blade replacement, blade sharpening, or changing blades for custom pattern blades. In every case when a blade is replaced onto a blade drum, an adjustment needs to be made to insure that the blade extends a proper distance out from the blade drum. The present invention provides a device for easily and speedily setting the blades in proper position. The present invention may be utilized on a variety of devices, such as the devices manufactured by Belsaw Machinery Company of Kansas City, Mo., RBI Industries, Inc. of Pleasant Hill, Mo., and Woodmaster Tools of Kansas City, Mo.

An object of the present invention is to provide a device which gives an easy, accurate and time-saving way to adjust the blades secured to a blade drum.

Another object of the present invention is to provide a device which can adjust the blades on a blade drum which can be utilized on a variety of machines with blades secured to a blade drum.

Still another object of the present invention is to provide a device for adjusting the blades on a blade drum which can accurately set the blades at a desired distance outward from the blade drum.

A further object of the present invention is to provide a device for adjusting blades on a blade drum which has an electrical indicator to assist in reaching the proper and accurate adjustment.

Another object of the present invention is to provide a device for adjusting the blades on a blade drum which can be secured to a machine bed within the machine which utilizes the blades on a blade drum.

These and other objects and features of the invention will be apparent from the following description and appended claims.

Briefly, the invention is a device for calibrating the height of a blade above a blade drum surface of a blade drum on a machine. The device comprises an upper section, a base section, and stabilizing means securing the base section to the machine. The upper section comprises a drum contact surface which is sized and shaped to fit onto the blade drum surface of the blade drum of the machine. The base section is rigidly secured to the upper section and is operative to be placed onto the machine.

The drum contact surface has a notched opening in the upper section. The blade may project into the notched opening when the drum contact surface rests on the blade drum surface.

Adjustable electrical contact means projects downward through the upper section into the notched opening in the drum contact surface of the upper section. Electrical indication means is connected to the adjustable electrical contact means and to the blade. When the adjustable electrical contact means contacts the blade, the electrical indication means is operative.

The height adjustment gauge means is secured to the upper section and is operative to indicate the distance between the adjustable electrical contact means and the blade drum surface of the blade drum. The adjustable electrical contact means projects downward through the upper section into the notched opening in a position which is not centered within the notched opening, forming an open section apart from the adjustable electrical contact means.

Blade height adjustment means within the blade drum is operative to raise or lower the height of the blade to determine electrical contact with the adjustable electrical contact means.

A vertical section is rigidly secured between the upper section and the base section of the device. The vertical section comprises a vertical arm recess shaped to avoid contact with any other blade above the blade drum surface of the blade drum when the blade is projected into the notched opening.

The electrical indication means comprises a power source means and electrical indicator means. The power source means is connected in series with the blade and the adjustable electrical contact means. The electrical indicator means is connected in series with the blade, the adjustable electrical contact means, and the power source. The electrical indicator means may be a buzzer. The electrical indicator means may be a light. The adjustable electrical contact means may comprise an adjustable screw. The adjustable screw may comprise a screw head, a threaded body, and a screw end section. When the screw end section contacts the blade, the electrical indication means is operative. The bottom edge of the screw head may be an indicator for the height adjustment gauge.

The stabilizing means may comprise magnetic means within the base section operative to secure the base section to the machine. Stabilizing means may also comprise clamping means securing the base section to the machine. Device height adjustment means is operative to raise and lower the device from and onto the machine whereby the drum contact surface rests on the blade drum surface.

The invention will be more fully understood from the following detailed description and appended claims when taken with the drawings in which:

Figure 3:
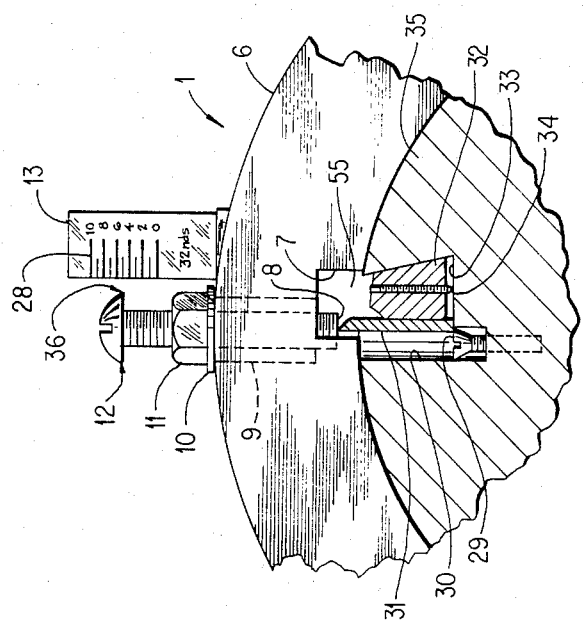

FIG. 3 is a partial sectional view through the upper portion of blade drum 35 and the upper portion of blade calibration device 1 showing methods of adjustment for cutting blade 31.

Figure 1:
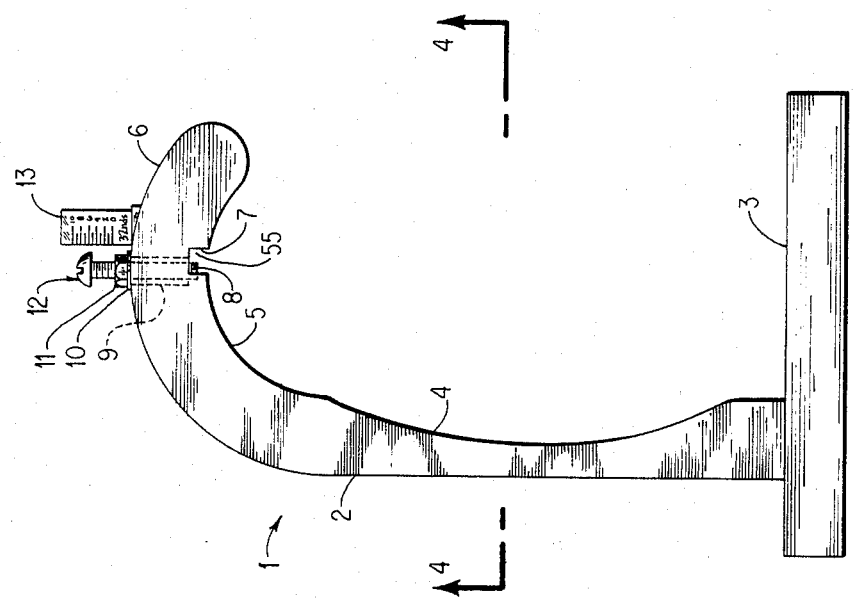
FIG. 1 is a side elevational view of the blade calibration device 1 as designed to be secured onto a machine bed.
Figure 4:
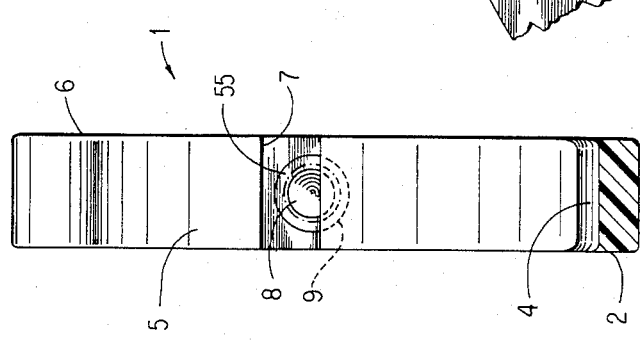

FIG. 4 is a partial bottom sectional view taken at section 4—4 of FIG. 1.

Figure 5:
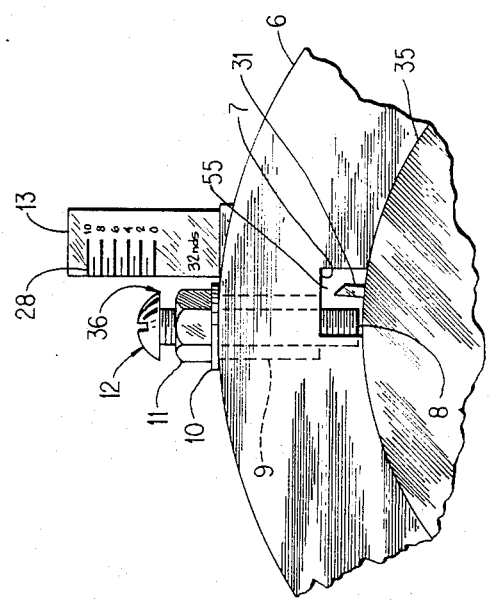

FIG. 5 is an enlarged partial elevational view of the upper portion of blade calibration device 1 and the upper portion of blade drum 35 shown with the bottom face 36 of adjustment screw 12 set at "0" on height adjustment gauge 13, and cutting blade 31 positioned to the side of the blade face 8 of adjustment screw 12.

Figure 6:
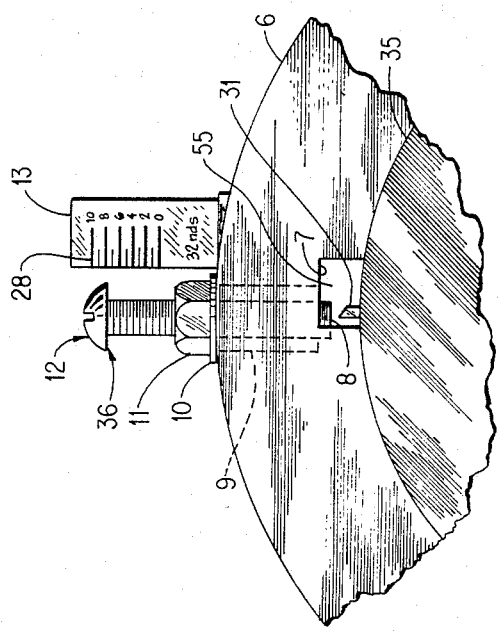

FIG. 6 is an enlarged partial elevational view of the upper portion of blade calibration device 1 and the upper portion of blade drum 35 shown with the bottom face 36 of adjustment screw 12 set at "8" on height adjustment gauge 13, and cutting blade 31 positioned beneath the blade face 8 of adjustment screw 12.

Figure 7:
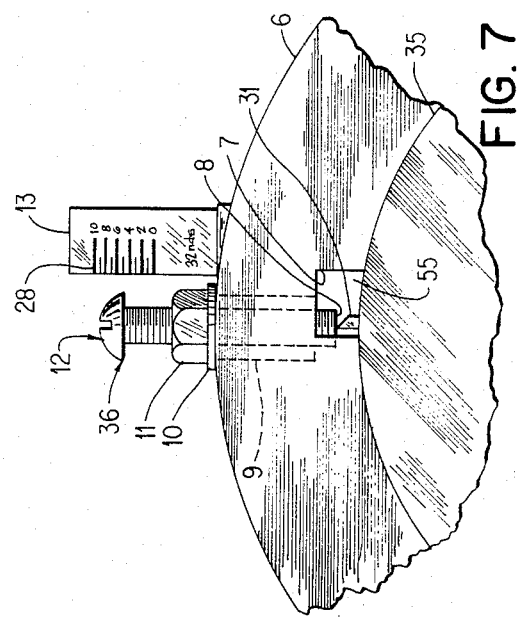

FIG. 7 is an enlarged partial elevational view of the upper portion of blade calibration device 1 and the upper portion of blade drum 35 shown with the bottom face 36 of adjustment screw 12 set at the desired height of "5" on height adjustment gauge 13, and the cutting blade 31 positioned beneath and making contact with the blade face 8 of adjustment screw 12.

FIG. 8 is a schematic electrical wiring diagram for the electrical indicator system.

FIG. 9 is a sectional view through machine 42 with the blade calibration device 1 in place for use.

FIG. 10 is a sectional view through machine 42 with the machine bed 46 raised to allow removal of the blade calibration device 1.

Figure 11:
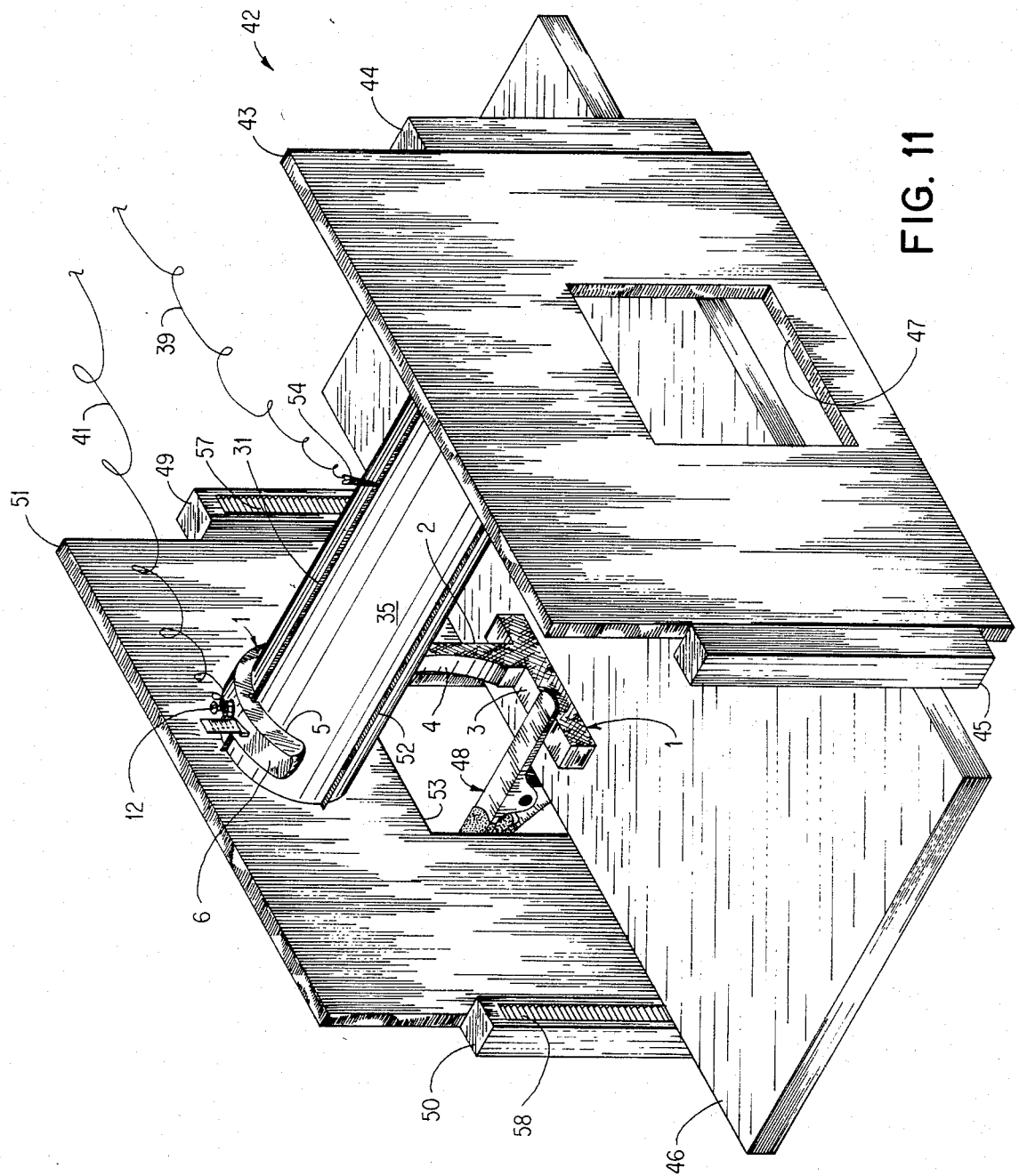

FIG. 11 is an isometric elevational view of the machine 42 showing the blade calibration device 1 secured onto machine bed 46.

Referring now to the drawings, FIG. 1 is a side elevational view of the blade calibration device 1 as designed to be secured onto a machine bed. Blade calibration device 1 comprises a vertical arm 2, a base 3, and a head 6. Secured onto head 6 is a height adjustment gauge 13 and an adjustment screw 12. Adjustment screw 12 extends through a lock nut 11, a washer 10, and a threaded tap 9 within head 6. The blade face 8 of adjustment screw 12 extends into the notched opening 7 in head 6. The blade calibration device 1 in FIG. 1 may be secured onto a machine bed.

The vertical arm 2 has a vertical arm recess 4 to insure that other blades on a drum in which a blade is within notched opening 7 will not strike vertical arm 2. The lower portion of head 6 has a drum contact surface 5 which is designed to fit snugly over a drum which has a blade which will fit within notched opening 7. Notched opening 7 has an upper section 55.

Figure 2:
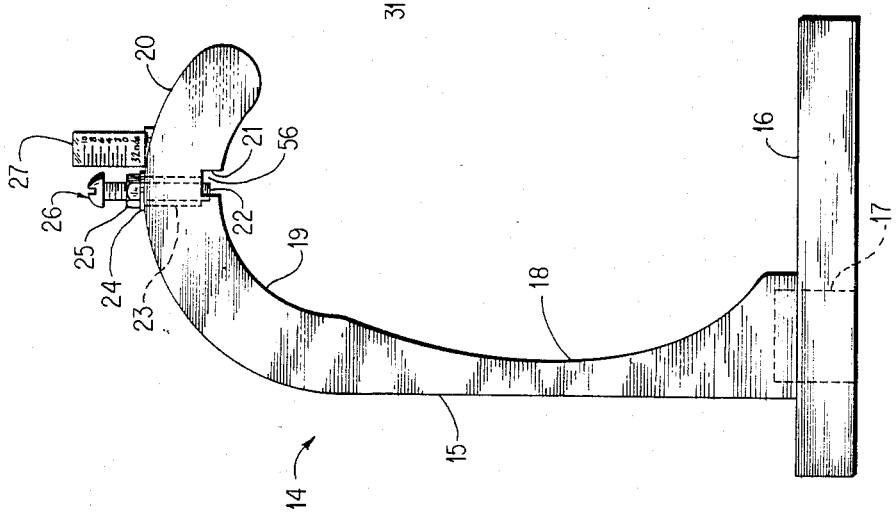
FIG. 2 is a side elevational view of the blade calibration device 14 with an implanted magnetic securing means 11 for magnetic connection to a machine bed.

FIG. 2 is a side elevational view of the blade calibration device 14 with an implanted magnetic securing means 11 for magnetic connection to a machine bed. Blade calibration device 14 comprises a vertical arm 15, a base 16, and a head 20. An implanted magnetic securing means 17 is within base 16 and the lower portion of vertical arm 15. Base 16, with the implanted magnetic securing means 17, will magnetically secure the blade calibration device 14 onto a metal machine bed. The implanted magnetic securing means 17 may be of any design or configuration with any desired magnetic strength. The implanted magnetic securing means 17 may be simply in base 16, or may extend as shown into the vertical arm 15.

Securing onto head 20 is a height adjustment gauge 27 and an adjustment screw 26. Adjustment screw 26 extends through a lock nut 25, a washer 24, and a threaded tap 23 within head 20. The blade face 22 of adjustment screw 26 extends into the notched opening 21 in head 20. The vertical arm 15 has a vertical arm recess 18 to insure that other blades on a drum in which a blade is within notched opening 21 will not strike vertical arm 15.

The lower portion of head 20 has a drum contact surface 19 which is designed to fit snugly over a drum which has a blade which will fit within a notched opening 21. Notched opening has an upper section 56.

Blade calibration device 14 is similar to blade calibration device 1 with the difference being the implanted magnetic securing means 17.

FIG. 3 is a partial sectional view through the upper portion of blade drum 35 and the upper portion of blade calibration device 1 showing methods of adjustment for cutting blade 31. Pressing against cutting blade 31 is a wedge action gib 32 within a gib slot 33. Gib adjustment screw 34 adjusts the pressure of the wedging action of wedge action gib 32 against cutting blade 31. A plurality of wedge action gibs 32 may be utilized to secure to cutting blade 31 within the blade drum 35. A jack screw 29 within jack screw slot 30 controls the raising and lowering of cutting blade 31.

The bottom edge 36 of the screw head of adjustment screw 12 is shown set at "5" on height adjustment gauge 13. The blade face 8 of adjustment screw 12 is touching the tip of cutting blade 31. Therefore, the jack screw 29 has been turned to raise the cutting blade 31 to a level of 5/32nds of an inch above the surface of the blade drum 35. This height is desirable for certain cutting blades 31. The height adjustment gauge 13 is placed onto head 6 of blade calibration device 1 in a manner that the incremental markings 28 are aligned with the bottom face 8 of adjustment screw 12 to indicate the distance between the blade drum 35 and the blade face 8 of adjustment screw 12. The wedge action gib or gibs 32 hold the cutting blade 31 within blade drum 35 while the cutting blade 31 is raised or lowered by jack screw 29.

FIG. 4 is a partial bottom sectional view taken at section 4—4 of FIG. 1. The vertical arm 2, the vertical arm recess 4, and the head 6 of blade calibration device 1 are shown. The drum contact surface 5 of head 6 is seen. The blade face 8 of adjustment screw 12 is shown off-centered within notched opening 7. The blade face 8 of adjustment screw 12 is shown within threaded tap 9.

Since the blade face 8 of adjustment screw 12 is off-centered within notched opening 7, there is an upper section 55 within notched opening 7. The blade face 8 of adjustment screw 12 is shown not to extend through the drum contact surface 5 of head 6. This design prevents the possibility of the blade face 8 of adjustment screw 12 protruding through the drum contact surface 5 and potentially contacting the blade drum 35.

FIG. 5 is an enlarged partial elevational view of the upper portion of blade calibration device 1 and the upper portion of blade drum 35 shown with the bottom face 36 of adjustment screw 12 set at "0" on height adjustment gauge 13, and cutting blade 31 positioned to the side of the blade face 8 of adjustment screw 12. The blade face 8 of adjustment screw 12 is virtually on the blade drum 35. This is shown for illustrative purposes. The cutting blade 31 is within the open section 55 of notched opening 7. When the blade drum 35 is moved moving the cutting blade 31 toward the adjustment screw 12, electrical contact will be made between the adjustment screw 12 and the cutting blade 31; thereby, causing the electrical indicator system of FIG. 8 to activate.

FIG. 6 is an enlarged partial elevational view of the upper portion of blade calibration device 1 and the upper portion of blade drum 35 shown with the bottom face 26 of adjustment screw 12 set at "8" on height adjustment gauge 13, and cutting blade 31 positioned beneath the blade face 8 of adjustment screw 12. The cutting blade 31 is shown not in the open section 55 of notched opening 7, but below the blade face 8 of adjustment screw 12. This figure is for illustrative purposes showing the blade face 8 of adjustment screw 12 at a larger distance from the blade drum 35 than the outer edge of cutting blade 31. No electrical contact between cutting blade 31 and blade face 8 of adjustment screw 12 is being made. As the adjustment screw 12 is lowered, the point where electrical contact is indicated would be the height of the outer portion of cutting blade 31 above the blade drum 35.

FIG. 7 is an enlarged partial elevational view of the upper portion of blade calibration device 1 and the upper portion of blade drum 35 shown with the bottom face 36 of adjustment screw 12 set at the desired height of "5" on height adjustment gauge 13, and the cutting blade 31 positioned beneath and making contact with the blade face 8 of adjustment screw 12. As the adjustment screw 12 in FIG. 6 is lowered, it reaches the point where contact is made between the cutting blade 31 and the blade face 8 of adjustment screw 12. This electrical contact would cause the electrical indicator system of FIG. 8 to activate. At the point of activation, the bottom edge 36 of the screw head of adjustment screw 12 would indicate on the incremental markings 28 of height adjustment gauge 13 the height of the outer edge of the cutting blade 31 above the blade drum 35.

FIGS. 5, 6, and 7 are shown for illustrative purposes. As a practical matter, the device will be utilized as follows. The bottom edge 36 of the screw head of adjustment screw 12 will be aligned with the incremental markings 28 on height adjustment gauge 13 at a desired level, such as 5/32nds of an inch or "5". The jack screw 29, as shown in FIG. 3, will be adjusted to raise or lower the cutting blade 31. The cutting blade 31 will be raised or lowered into the open section 55 of notched opening 7. The blade drum 35 will be moved in order to move the cutting blade 31 out of the open section 55 and toward the blade face 8 of adjustment screw 12. If there is no electri- cal indication, then there is no electrical contact and the blade drum 35 would then be moved to move the cutting blade 31 back into the open section 55 of notched opening 7 and the cutting blade 31 will be gradually raised.

When the cutting blade 31 is at a proper height, electrical contact will be made between the cutting blade 31 and the blade face 8 of adjustment screw 12; thereby, activating the electrical indicator system. The cutting blade 31 may have a plurality of jack screw adjustments depending upon the length of the cutting blade 31. This procedure may be repeated in order to level the cutting blade 31 across the blade drum 35.

If the electrical contact is made initially between cutting blade 31 and the blade face 8 of adjustment screw 12, then the jack screw 29 would be utilized to lower the cutting blade 31 until electrical contact is lost. Incremental adjustments in the raising and lowering of cutting blade 31 will produce the desired height for cutting blade 31.

FIG. 8 is a schematic electrical wiring diagram for the electrical indicator system. Conducting wire 39 is connected between the cutting blade 31 and the power source 37. Conducting wire 40 connects power source 37 to electrical indicator 38. Conducting wire 41 connects electrical indicator 38 to adjustment screw 12. The conducting wire 39 may be connected to cutting blade 31 in any desired manner. The conducting wire 41 may be connected to adjustment screw 12 in any desired manner.

When adjustment screw 12 makes electrical contact with cutting blade 31, the circuit is completed causing the electrical indicator 38 to be activated. As in any other series electrical circuit, the components may be placed at different positions within the circuit.

To simplify the drawings, no electrical connections have been shown in the prior figures. However, to perform the functions of the blade calibration device 1 or the blade calibration device 14 as desired, these electrical connections will be made as shown in FIG. 8.

FIG. 9 is a sectional view through machine 42 with the blade calibration device 1 in place for use. As can be seen, the head 6 of the blade calibration device 1 fits snugly onto the blade drum 35, with the drum contact surface 5 in contact with the blade drum 35.

The machine 42 is shown illustratively with a machine side member 43, bed adjustment means 44 and 45, and machine bed 46. Bed adjustment means 49 and 50 are shown in FIG. 11. The machine bed 46 has been adjusted by the bed adjustment means 44, 45, 49, and 50 so that the head 6 of blade calibration device 1 fits snugly onto blade drum 35. Blade clamping device 48 is shown holding the base 3 of blade calibration device 1 onto the machine bed 46, thereby stabilizing blade calibration device 1. If blade calibration device 14 were utilized with an implanted magnetic securing means 17, clamping device 48 would not be necessary. Clamping device 48 extends through opening 47 in side member 43 of machine 42.

FIG. 10 is a sectional view through machine 42 with the machine bed 46 raised to allow removal of the blade calibration device 1. The bed adjustment means 44, 45, 49, and 50 may be utilized to raise the machine bed 46. The head 6 of blade calibration device 1 is shown clear of the blade drum 35. When clamping device 48 is removed, the blade calibration device 1 may be easily removed.

FIG. 11 is an isometric elevational view of the machine 42 showing the blade calibration device 1 secured onto machine bed 46. Bed adjustment means 49 has adjusting teeth 57. Bed adjustment means 50 has adjusting teeth 58. Adjusting teeth exist but are not shown on bed adjustment means 44 and 45. The bed adjustment means 44, 45, 49 and 50 are merely illustrative and can be any bed adjustment means operative to raise and lower the machine bed 46. The blade calibration device 1 is shown secured onto machine bed 46 by clamping device 48 and fitting snugly onto blade drum 35. The conducting wire 39 is shown connected by wire clip 54 to cutting blade 31. Conducting wire 41 is shown connected to adjustment screw 12.

The cutting blade 31 may be adjusted to a desired height as indicated herein. The blade calibration device 1 may then be moved to the other side of the blade drum 35. The bed adjustment means 44, 45, 49, and 50 would be raised to allow clearance for the head 6 of blade calibration device 1. The clamping device 48 would be removed. The blade calibration device 1 would then be moved to the other end of the blade drum 35. The clamping device 48 would be placed through opening 47 in machine side member 43 as shown in FIGS. 9 and 10. In FIG. 11, the clamping device 48 is shown extending through opening 53 in machine side member 51.

The blade drum 35 is illustrated to contain three blades, cutting blades 31, 52, and a third blade not shown. The third blade, not shown, would be the blade which is being avoided by the vertical arm recess 4 of vertical arm 2 of blade calibration device 1.

The blade calibration devices 1 and 14 give an easy, accurate and time-saving way to adjust the blades secured to a blade drum on a machine. The blade calibration devices 1 and 14 can be utilized on a variety of machines with blades secured to a blade drum. The blade calibration devices 1 and 14 can be secured to a machine bed within the machine which utilizes the blades on a blade drum.

The present invention provides a device for adjusting the blades on a blade drum which can accurately set the blades at a desired distance outward from the blade drum. The invention also provides for a electrical indicator to assist in reaching the proper and accurate adjustment.

The blade calibration device 1 does not require any internal adjustment means as the entire device is raised and lowered by the bed adjustment means of the machine. There may be any plurality desire of jack screw adjustments and of wedge action gibs. The drawings are merely illustrative. Unnecessary details of the various machines which were not needed for the explanation of this invention have been omitted.

The power source may be a battery or any power source desired. The electrical indicator may be a buzzer, a light, or any other desired electrical indicator. The stabilizing means for the blade calibration device on the machine bed may be an implanted magnetic securing means, such as implanted magnetic securing means 17 on blade calibration device 14, a clamping device, such as clamping device 48 on blade calibration device 1, or any other desired securing means. The cutting blade 31 within blade drum 35 may be held, raised, or lowered by any desired means. The machine 42 may be a wood planer or any other desired machine. The height adjustment gauge 13 may be any desired gauge means calibrated in any manner desired. The notched opening 7 and the open section 55 may be of any desired size.

The adjustment screw 12 is actually an adjustable electrical contact means which projects toward and through the upper section on head 6 of the blade calibration device 1 into the notched opening 7 in the drum contact surface 5 of head 6.

The present invention is a faster, more accurate, and easier-to-utilize adjustment device than any device in present use.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

I claim:

1. A device for calibrating the height of a blade above a blade drum surface of a blade drum on a machine comprising:
   a. an upper section comprising a drum contact surface, sized and shaped to fit onto said blade drum surface of said blade drum of said machine;
   b. a base section rigidly secured to said upper section and operative to be placed onto said machine;
   c. stabilizing means securing said base section to said machine;
   d. a notched opening in said drum contact surface of said upper section into which said blade may project when said drum contact surface rests on said blade drum surface;
   e. adjustable electrical contact means projecting downward through said upper section into said notched opening and being aligned off-center in said opening and partially recessed into said upper section so that only a portion of the lower end of said electrical contact means is exposed within said notched opening; and
   f. electrical indication means connected to said adjustable electrical contact means and to said blade, whereby when said adjustable electrical contact means contacts said blade, said electrical indication means is operative.

2. A device according to claim 1 further comprising a height adjustment gauge means secured to said upper section and operative to indicate the distance between said adjustable electrical contact means and said blade drum surface of said blade drum.

3. A device according to claim 1 further comprising blade height adjustment means within said blade drum operative to raise or lower said height of said blade to determine electrical contact with said adjustable electrical contact means.

4. A device according to claim 1 further comprising a vertical section rigidly securing said upper section of said device to said base section of said device.

5. A device according to claim 4 wherein said vertical section comprises a vertical arm recess shaped to avoid contact with any other blade above said blade drum surface of said blade drum when said blade is projected into said notched opening.

6. A device according to claim 1 wherein said electrical indication means comprises:
   a. power source means connected in series with said blade and said adjustable electrical contact means; and
   b. electrical indicator means connected in series with said blade, said adjustable electrical contact means, and said power source.

7. A device according to claim 6 wherein said electrical indicator means is a buzzer.

8. A device according to claim 6 wherein said electrical indicator means is a light.

9. A device according to claim 1 wherein said adjustable electrical contact means comprises an adjustment screw comprising a screw head, a threaded body, and a screw end section, whereby when said screw end section contacts said blade, said electrical indication means is operation.

10. A device according to claim 9 further comprising a height adjustment gauge means secured to said upper section and operative to indicate the distance between said adjustable electrical contact means and said blade drum surface of said blade drum.

11. A device according to claim 10 wherein the bottom edge of said screw head is an indicator for said height adjustment gauge.

12. A device according to claim 1 wherein said stabilizing means comprises magnetic means within said base section operative to secure said base section to said machine.

13. A device according to claim 1 wherein said stabilizing means comprises clamping means securing said base section to said machine.

* * * * *